United States Patent
Hayashi et al.

(10) Patent No.: US 8,837,181 B2
(45) Date of Patent: Sep. 16, 2014

(54) STEP DOWN SWITCHING REGULATOR

(71) Applicant: Rohm Co., Ltd., Kyoto (JP)

(72) Inventors: Hiroshi Hayashi, Kyoto (JP); Yoshinori Sato, Kyoto (JP); Satoru Nate, Kyoto (JP)

(73) Assignee: Rohm Co., Ltd. (JP)

( * ) Notice: Subject to any disclaimer, the term of this patent is extended or adjusted under 35 U.S.C. 154(b) by 0 days.

(21) Appl. No.: 14/079,111

(22) Filed: Nov. 13, 2013

(65) Prior Publication Data

US 2014/0218988 A1 Aug. 7, 2014

Related U.S. Application Data

(63) Continuation of application No. PCT/JP2012/003125, filed on May 14, 2012.

(30) Foreign Application Priority Data

May 13, 2011 (JP) ................................. 2011-108423

(51) Int. Cl.
- *H02M 5/42* (2006.01)
- *H02M 7/04* (2006.01)
- *H02M 7/68* (2006.01)
- *G05F 1/00* (2006.01)

(52) U.S. Cl.
USPC .......................................... 363/89; 323/282

(58) Field of Classification Search
USPC .......................................... 363/89; 323/282
See application file for complete search history.

(56) References Cited

U.S. PATENT DOCUMENTS

| | | | | |
|---|---|---|---|---|
| 6,101,106 | A * | 8/2000 | Shi ................................ | 323/282 |
| 6,608,450 | B2 * | 8/2003 | Lestician ....................... | 315/224 |
| 6,781,352 | B2 * | 8/2004 | Athari et al. .................. | 323/282 |
| 2004/0095118 | A1 * | 5/2004 | Kernahan ...................... | 323/282 |
| 2007/0108951 | A1 * | 5/2007 | Coleman ....................... | 323/282 |

FOREIGN PATENT DOCUMENTS

| JP | 2008104285 A | 5/2008 |
|---|---|---|
| JP | 2008199705 A | 8/2008 |
| JP | 2009278756 A | 11/2009 |

OTHER PUBLICATIONS

International Search Report for PCT/JP2012/003125, date of Mailing Aug. 14, 2012; with English Translation.

* cited by examiner

*Primary Examiner* — Jue Zhang
(74) *Attorney, Agent, or Firm* — Cantor Colburn LLP

(57) ABSTRACT

A current limiting comparator generates a current limiting signal $S_{LIM}$ which is asserted when a detection voltage Vs at a detection terminal CS is higher than a predetermined threshold voltage $V_{TH}$. A mask signal generating unit generates a mask signal $S_{MSK}$ which is asserted after a predetermined delay time $T_{MSK}$ elapses after a switching transistor is turned on. A pulse signal generating unit has: a function (a) in which, when the set signal $S_{SET}$ is asserted in a period in which the current limiting signal $S_{LIM}$ is negated, a pulse signal $S_{PWM}$ is switched to a first level; and a function (b) in which, when the reset signal $S_{RST}$ is asserted, or when the current limiting signal $S_{LIM}$ is asserted in a period in which the mask signal $S_{MSK}$ is negated, the pulse signal $S_{PWM}$ is switched to a second level.

10 Claims, 7 Drawing Sheets

PRIOR ART

PRIOR ART

STEP DOWN SWITCHING REGULATOR

BACKGROUND OF THE INVENTION

1. Field of the Invention

The present invention relates to a non-insulated step-down switching regulator (DC/DC converter).

2. Description of the Related Art

Various kinds of consumer electronics devices such as TVs, refrigerators, etc., or otherwise electronic devices such as laptop computers, cellular phone terminals, and PDAs (Personal Digital Assistants), each mount a switching regulator which steps down a DC voltage to a voltage level that corresponds to a load.

FIG. 1 is a circuit diagram showing a configuration of a non-insulated step-down switching regulator investigated by the present inventors. A switching regulator 2r steps down a DC input voltage $V_{IN}$ input to its input terminal P1, and outputs the voltage thus stepped down to its output terminal P2.

The switching regulator 2r includes a switching transistor M1 configured as an N-channel MOSFET, a rectifier diode D1, an inductor L1, an output capacitor C1, a current detection resistor Rs, a control circuit 100r, and a feedback circuit 102.

One end of the current detection resistor Rs is connected to the switching transistor M1. The other end of the current detection resistor Rs is connected to the cathode of the rectifier diode D1. One end of the inductor L1 is connected to the cathode of the rectifier diode D1. The other end of the inductor L1 is connected to the output capacitor C1.

The control circuit 100r is configured as a control circuit employing a current mode pulse width modulation method or otherwise a voltage mode pulse width modulation method. The control circuit 100r includes a current detection terminal CS, a switching terminal OUT, a feedback terminal FB, and a ground terminal GND. The control circuit 100r is arranged such that its switching terminal OUT is connected to the gate of the switching transistor M1, its ground terminal GND is connected to the cathode of the rectifier diode D1, and its current detection terminal CS is connected to one end of the current detection resistor Rs. During the on period of the switching transistor M1, a coil current $I_L$ flows between the current detection resistor Rs and the inductor L1. In this state, a voltage drop (detection voltage Vs) occurs across the current detection resistor Rs in proportion to the coil current $I_L$. The detection voltage Vs is fed back to the current detection terminal CS.

The feedback circuit 102 generates a feedback voltage $V_{FB}$ according to the output voltage $V_{OUT}$ of the switching regulator 2r, and inputs the feedback voltage $V_{FB}$ thus generated to the feedback terminal FB of the control circuit 100r. The feedback circuit 102 includes a photocoupler, for example. The feedback circuit 102 functions as an error amplifier which generates a feedback voltage $V_{FB}$ according to a difference between the output voltage $V_{OUT}$ and a target value.

The control circuit 100r generates a pulse signal $S_{PWM}$ having a duty ratio which is adjusted such that the output voltage $V_{OUT}$ matches the target value according to the feedback voltage $V_{FB}$ while maintaining the coil current $I_L$ at a constant level according to the detection voltage Vs.

Specifically, the control circuit 100r turns on the switching transistor M1 for every predetermined period. When the switching transistor M1 is turned on, the coil current $I_L$ of the inductor L1 increases with time. The detection voltage Vs increases according to an increase in the coil current $I_L$.

When the detection voltage Vs reaches the feedback voltage $V_{FB}$, i.e., when the coil current $I_L$ reaches a current value which is adjusted according to the output voltage $V_{OUT}$, the control circuit 100r turns off the switching transistor M1. The control circuit 100r repeatedly performs the aforementioned operation, thereby switching on and off the switching transistor M1.

With the switching regulator 2r shown in FIG. 1, during the off period of the switching transistor M1, charge is stored in the drain-source capacitance of the switching transistor M1. When the switching transistor M1 is turned on, the charge stored in the drain-source capacitance is instantly discharged. In this case, spike current flows through the current detection resistor Rs. This leads to overestimation of the coil current $I_L$ that flows through the inductor L1. As a result, immediately after the switching transistor M1 is turned on, and before the coil current reaches a sufficiently increased value, the switching transistor M1 is turned off, which is a problem.

In order to prevent misdetection of the coil current $I_L$ due to such a spike current, a method is conceivable in which, during a predetermined mask time $T_{MSK}$ immediately after the switching transistor M1 is turned on, the detection voltage Vs is masked. With such an arrangement employing such a mask time $T_{MSK}$, the switching transistor M1 is not switched to the off state, i.e., the switching transistor M1 is maintained at the on level, during at least the mask time $T_{MSK}$ for each cycle. That is to say, the mask time $T_{MSK}$ functions as the minimum on time of the switching transistor M1.

SUMMARY OF THE INVENTION

The present inventors have investigated such a switching regulator employing such a mask time, and have come to recognize the following problem.

Let us consider a situation in which a ground fault has occurred at the output terminal P2 of the switching regulator 2r. FIG. 2 is a waveform diagram in a case in which a ground fault has occurred at the output of the switching regulator 2r shown in FIG. 1. In each waveform diagram and each time chart in the present specification, the vertical axis and the horizontal axis are expanded or reduced as appropriate for ease of understanding. Also, each waveform shown in the drawings is simplified for ease of understanding.

Even in a case in which a ground fault has occurred at the output terminal P2, the switching transistor M1 is turned on during at least the mask time $T_{MSK}$ for each cycle. The time rate of change of the coil current $I_L$ of the inductance L is represented by the following Expression (1) using the voltage $V_L$ across both ends of the inductance L.

$$dI_L/dt = V_L/L \qquad (1)$$

When the switching transistor M1 is turned on, the input voltage $V_{IN}$ is applied to one end of the inductor L1. In this state, 0 V is applied to the other end of the inductor L1 due to the ground fault that has occurred at the output terminal. Thus, for every on time $T_{MSK}$, the coil current $I_L$ rises by the current amount $\Delta I_{ON}$ represented by the following Expression (2).

$$\Delta I_{ON} = T_{MSK} \times V_{IN}/L \qquad (2)$$

When the switching transistor M1 is turned off, the voltage $-V_F$ is applied to the aforementioned one end of the inductor L1 by means of the rectifier diode D1. Furthermore, 0V is applied to the other end of the inductor L1. Thus, for every off time, the coil current $I_L$ drops by the current amount $\Delta I_{OFF}$ represented by the following Expression (3).

$$\Delta I_{OFF} = T_{OFF} \times V_F/L \qquad (3)$$

In a case in which the input voltage $V_{IN}$ is set to 141 V, and $V_F$ is set to 0.6 V, the relation $\Delta I_{ON} > \Delta I_{OFF}$ holds true. Thus, the coil current increases with each cycle, leading to adverse effects on the circuit reliability.

Such a problem does not occur only in a case in which a ground fault has occurred at the output terminal. Also, the same problem can occur in a state in which the output voltage $V_{OUT}$ is low immediately after the switching regulator 2r is started up.

The above-described problem is by no means within the scope of common and general knowledge in the field of the present invention. Furthermore, it can be said that the present applicant has been the first to arrive at this consideration.

The present invention has been made in order to solve such a problem. Accordingly, it is an exemplary purpose of an embodiment of the present invention to provide a switching regulator having improved reliability even in a state in which the output voltage is low.

An embodiment of the present invention relates to a control circuit for a step-down switching regulator. The switching regulator is configured to receive an input voltage via its input terminal, and to output a stepped-down output voltage via its output terminal. The switching regulator comprises: a switching transistor, a detection resistor, and an inductor, sequentially arranged in series between the input terminal and the output terminal; a rectifier diode arranged between a ground terminal and a connection node that connects the switching transistor and the detection resistor; and an output capacitor arranged between the output terminal and the ground terminal. The control circuit comprises: a switching terminal to be connected to a control terminal of the switching transistor; a current detection terminal to be connected to a connection node that connects the switching transistor and the detection resistor; a ground terminal to be connected to a connection node that connects the detection resistor and the inductor; a feedback terminal via which a feedback voltage that corresponds to the output voltage is to be input; a current limiting comparator configured to generate a current limiting signal which is asserted when a detection voltage at the detection terminal is higher than a predetermined threshold voltage; an oscillator configured to generate a set signal which is asserted for every predetermined period; a mask signal generating unit configured to generate a mask signal which is asserted after a predetermined delay time elapses after the switching transistor is turned on; a reset signal generating unit configured to generate a reset signal which is asserted at a timing that is adjusted according to the feedback voltage; a pulse signal generating unit configured to generate a pulse signal which is set to a first level during a period in which the switching transistor is to be turned on, and which is set to a second level during a period in which the switching transistor is to be turned off, and to have: a function (a) in which, when the set signal is asserted in a period in which the current limiting signal is negated, the pulse signal is switched to the first level; and a function (b) in which, when the reset signal is asserted, or when the current limiting signal is asserted in a period in which the mask signal is negated, the pulse signal is switched to the second level; and a driver configured to output a switching signal that corresponds to the pulse signal, to the control terminal of the switching transistor via the switching terminal.

With such an embodiment, a coil current flows through the current detection resistor not only during the on period of the switching transistor, but also during its off period. Thus, such an arrangement is capable of monitoring the coil current in both the on period and the off period of the switching transistor.

If the output voltage falls due to the occurrence of a ground fault at the output terminal of the switching transistor, this leads to a gradual increase in the coil current that flows through the inductor. Eventually, the current limiting comparator detects the overcurrent state. The current limiting signal generated by the current limiting comparator is maintained in the asserted state regardless of whether the switching transistor enters the on period or off period. By masking the set signal using the current limiting signal, such an arrangement is capable of preventing the switching transistor from switching to the first level. In this state, such an arrangement is capable of maintaining the switching transistor in the off state, thereby preventing the coil current from continuing to rise. As a result, such an arrangement provides improved circuit reliability.

Another embodiment of the present invention relates to a switching regulator configured to receive an input voltage via its input terminal, and to output a stepped-down output voltage via its output terminal. The switching regulator comprises: a switching transistor, a detection resistor, and an inductor, sequentially arranged in series between the input terminal and the output terminal; a rectifier diode arranged between a ground terminal and a connection node that connects the switching transistor and the detection resistor; an output capacitor arranged between the output terminal and the ground terminal; and the aforementioned control circuit configured to drive the switching transistor.

Yet another embodiment of the present invention relates to an electronic device. The electronic device comprises the aforementioned switching regulator.

Yet another embodiment of the present invention relates to an AC adapter. The AC adapter comprises the aforementioned switching regulator.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 3:
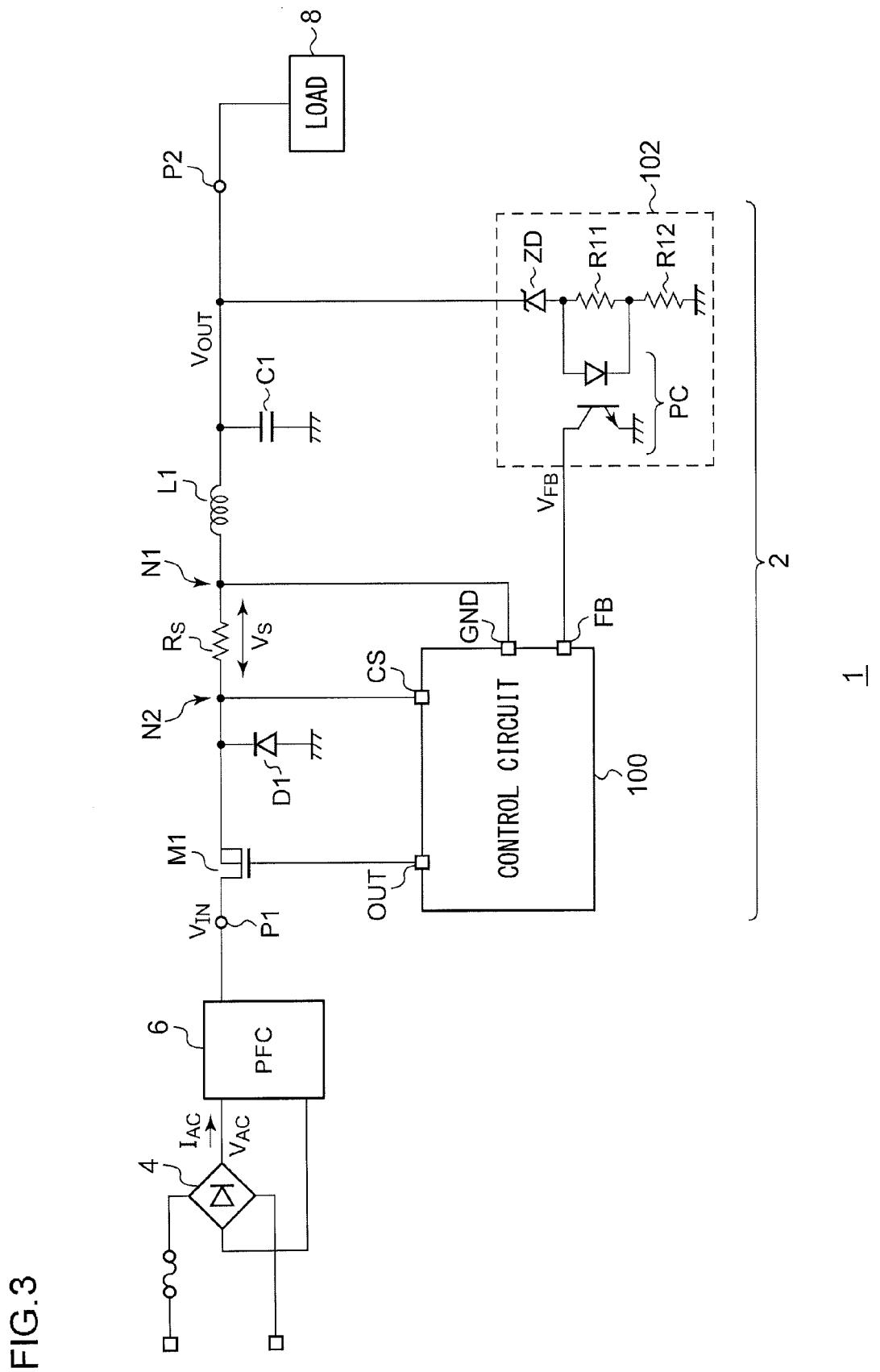
FIG. 3 is a circuit diagram showing a configuration of an electronic device according to an embodiment.

FIG. 3 is a circuit diagram showing a configuration of an electronic device 1 according to an embodiment.

The electronic device 1 is configured as a consumer electronics device such as a TV, refrigerator, air conditioner, etc., or otherwise a computer, for example. The electronic device 1 includes a switching regulator 2, a rectifier circuit 4, a PFC (power factor correction) circuit 6, and a load 8.

The rectifier circuit 4 is configured as a diode rectifier circuit, for example. The rectifier circuit 4 performs full-wave rectification of an AC voltage such as commercial AC voltage.

The PFC circuit 6 is configured as a step-up DC/DC converter (switching regulator) which receives the AC voltage $V_{AC}$ from the rectifier circuit 4 after it is subjected to full-wave rectification, and which generates an output voltage $V_{DC}$. The PFC circuit 6 controls the phases of the AC voltage $V_{AC}$ and the input current $I_{AC}$ such that they match each other, thereby improving the power factor.

The switching regulator 2 receives the input voltage $V_{IN}$ of the PFC circuit 6 via its input terminal P1, and steps down the input voltage $V_{IN}$ thus received so as to generate the output voltage $V_{OUT}$. The switching regulator 2 supplies the output voltage $V_{OUT}$ thus generated to the load 8 connected to its output terminal P2.

Examples of the load 8 include: a microcomputer which integrally controls the overall operation of the electronic device 1; and a processing circuit which performs predetermined signal processing. Examples of such a signal processing circuit include: an interface circuit which performs communication with an external device; an image processing circuit; an audio processing circuit; etc.

Next, description will be made regarding a configuration of the switching regulator 2. The switching regulator 2 includes a control circuit 100, a feedback circuit 102, a switching transistor M1, a rectifier diode D1, a current detection resistor Rs, an inductor L1, and an output capacitor C1.

The output circuit comprising the switching transistor M1, the rectifier diode D1, the inductor L1, and the output capacitor C1, has a typical step-down switching regulator topology.

Figure 1:
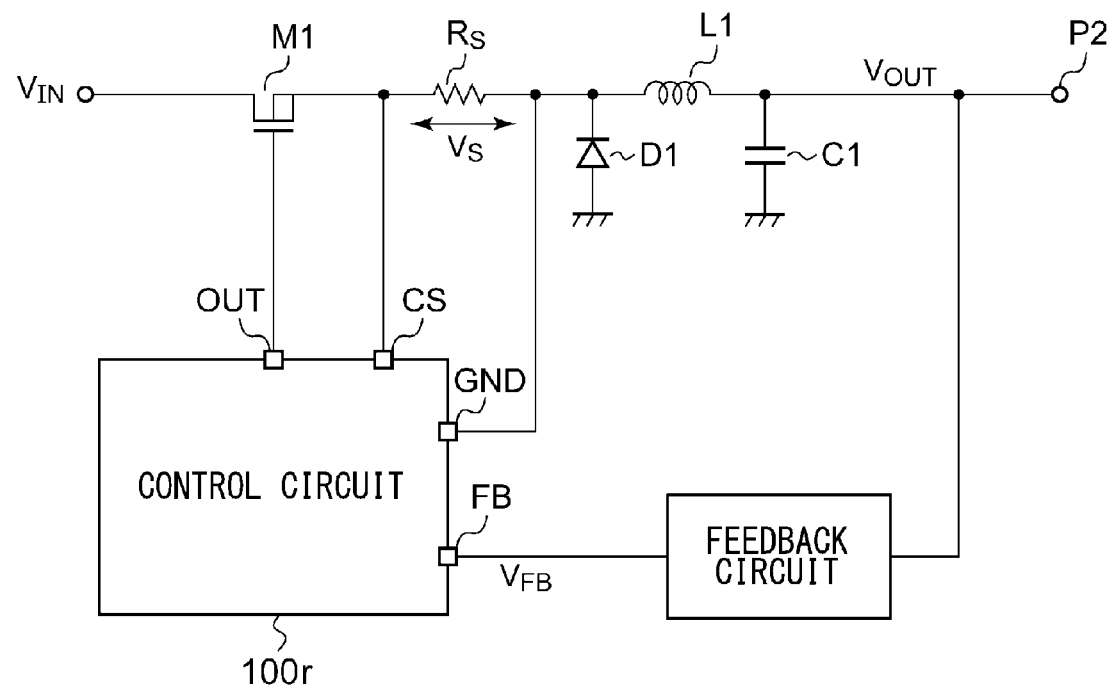
FIG. 1 is a circuit diagram showing a configuration of a non-insulated step-down switching regulator investigated by the present inventors.

In the switching regulator 2 shown in FIG. 3, the current detection resistor Rs is arranged between the cathode of the rectifier diode D1 and one terminal of the inductor L1, which is the point of difference between it and the switching regulator 2r shown in FIG. 1. That is to say, the switching transistor M1, the current detection resistor Rs, and the inductor L1 are sequentially arranged in series between the input terminal P1 and the output terminal P2. In FIG. 1, the coil current $I_L$ flows through the current detection resistor Rs during only the on period of the switching transistor M1. In contrast, it should be noted that, in FIG. 3, the coil current flows through the current detection resistor Rs during both the on period $T_{ON}$ and the off period $T_{OFF}$.

The control circuit 100 includes a switching terminal OUT, a current detection terminal CS, a ground terminal GND, and a feedback terminal FB.

The switching terminal OUT is connected to the control terminal (gate) of the switching transistor M1. The switching transistor M1 is configured as an N-channel MOSFET. In order to turn on the switching transistor M1, there is a need to apply, between its gate and source, a driving voltage that exceeds the threshold voltage of the MOSFET. With such an arrangement, the ground terminal GND of the control circuit 100 is connected to a connection node N1 that connects the detection resistor Rs and the inductor L1.

The current detection terminal CS is connected to a connection node N2 that connects the switching transistor M1 and the detection resistor Rs. A detection voltage Vs ($=Rs \times I_L$) develops between the current detection terminal CS and the ground terminal GND in proportion to the coil current $I_L$.

A feedback voltage $V_{FB}$, which corresponds to the output voltage $V_{OUT}$ of the switching regulator 2, is input to the feedback terminal FB of the control circuit 100. The feedback voltage $V_{FB}$ is generated by the feedback circuit 102.

The feedback circuit 102 includes a Zener diode ZD, resistors R11 and R12, and a photocoupler PC. The Zener diode ZD and the resistors R11 and R12 are sequentially arranged between the output terminal and the ground terminal. A current flows through an input-side light-emitting diode of the photocoupler PC according to a voltage drop across the resistor R11. At an output-side phototransistor of the photocoupler PC, the feedback voltage $V_{FB}$ is generated according to the output voltage $V_{OUT}$. The feedback circuit 102 functions as an error amplifier which generates an error voltage that corresponds to the difference between the output voltage $V_{OUT}$ and the target voltage thereof. It should be noted that the configuration of the feedback circuit 102 is not restricted in particular. Also, an operational amplifier may be employed as such an error amplifier. In this case, such an error amplifier may be built into the control circuit 100.

Figure 4:
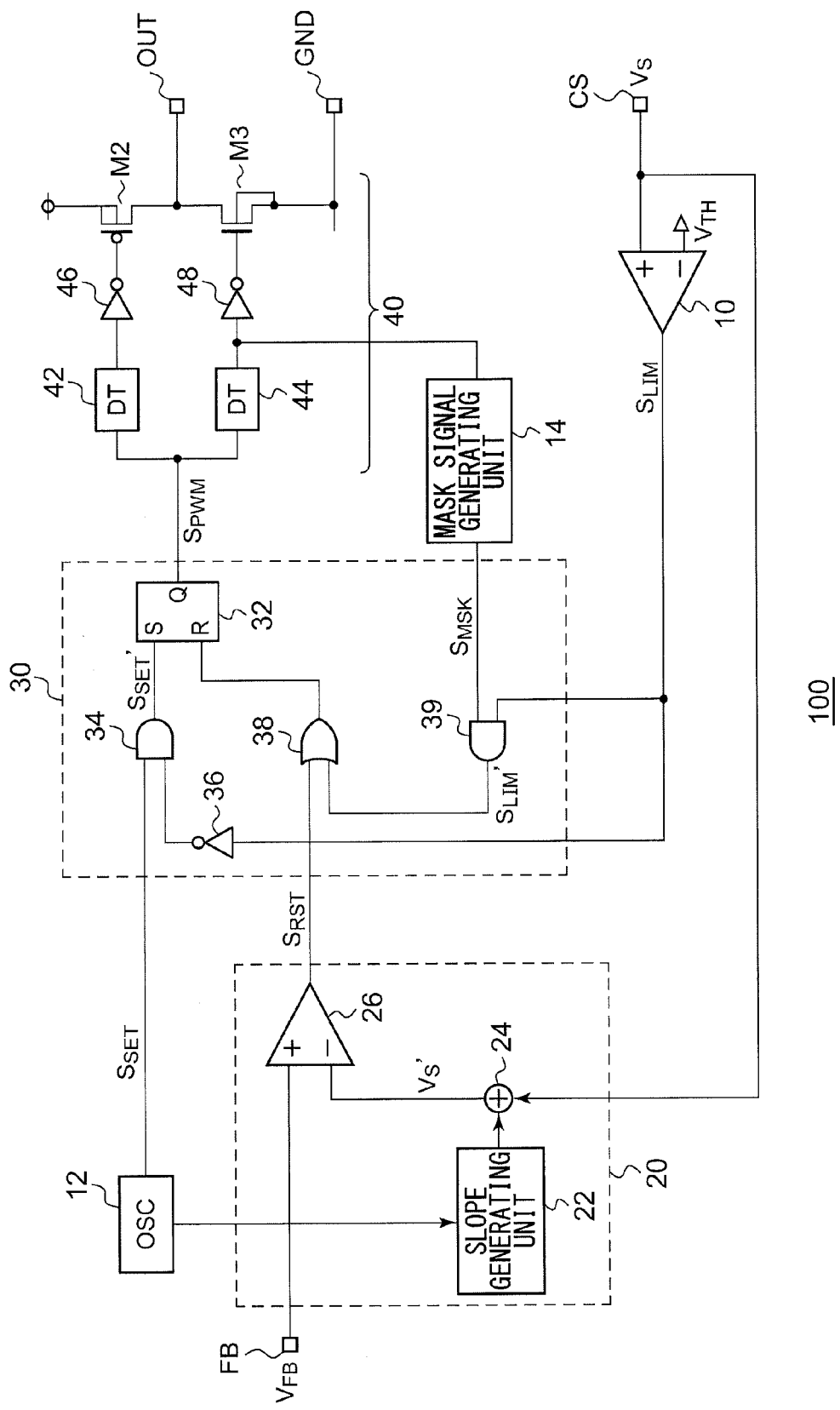
FIG. 4 is a circuit diagram showing a configuration of a control circuit shown in FIG. 3.

FIG. 4 is a circuit diagram showing a configuration of the control circuit 100 shown in FIG. 3.

The control circuit 100 includes a current limiting comparator 10, an oscillator 12, a mask signal generating unit 14, a reset signal generating unit 20, a pulse signal generating unit 30, and a driver 40. The control circuit 100 controls the switching operation of the switching transistor M1 in the peak current mode.

The current limiting comparator 10 generates a current limiting signal $S_{LIM}$ which is asserted (set to high level) when the detection voltage Vs at the detection terminal CS is higher than a predetermined threshold voltage $V_{TH}$. The current limiting signal $S_{LIM}$ is asserted in an overcurrent state in which the coil current $I_L$ exceeds a predetermined threshold level.

The oscillator 12 generates a set signal $S_{SET}$ which is asserted (set to high level) for every predetermined period.

The mask signal generating unit 14 generates a mask signal $S_{MSK}$ which is asserted after a predetermined delay time (mask time) $T_{MSK}$ elapses after the switching transistor M1 is turned on.

The reset signal generating unit 20 generates a reset signal $S_{RST}$ which is asserted (set to high level) at a timing which is adjusted according to the feedback voltage $V_{FB}$.

The reset signal generating unit 20 configured to operate in the peak current mode includes a slope generating unit 22, an adder 24, and an error comparator 26. The slope generating unit 22 generates a slope signal $S_{SLOPE}$ having a triangle waveform or otherwise a sawtooth waveform in synchronization with the set signal $S_{SET}$ generated by the oscillator 12. The adder 24 generates the sum of the detection voltage Vs and the slope signal $S_{SLOPE}$. The slope generating unit 22 and the adder 24 are arranged for phase compensation.

The error comparator 26 compares the feedback voltage $V_{FB}$ with a detection voltage Vs' obtained by means of the adder 24 by superimposing the detection voltage Vs on the slope signal $S_{SLOPE}$. With such an arrangement, the error comparator 26 generates the reset signal $S_{RST}$ which is asserted (set to high level) when the detection voltage Vs' becomes greater than the feedback voltage $V_{FB}$. The configuration of the reset signal generating unit 20 is not restricted in particular. Also, other configurations may be employed.

The pulse signal generating unit 30 generates a pulse signal $S_{PWM}$ which is set to a first level (high level) during a period in which the switching transistor M1 is to be turned on, and which is set to a second level (low level) during a period in which the switching transistor M1 is to be turned off. The pulse signal generating unit 30 has a function (a) in which, when the set signal $S_{SET}$ is asserted in a period in which the current limiting signal $S_{LIM}$ is negated (set to low level), the pulse signal $S_{PWM}$ is set to the first level (high level). Furthermore, the pulse signal generating unit 30 has a function (b) in which, when the reset signal $S_{RST}$ is asserted (set to high level) or when the current limiting signal $S_{LIM}$ is asserted in a period in which the mask signal $S_{MSK}$ is negated (set to low level), the pulse signal $S_{PWM}$ is set to the second level (low level).

The pulse signal generating unit 30 includes an SR flip-flop 32, a first AND gate 34, a first inverter 36, an OR gate 38, and a second AND gate 39, for example.

The first inverter 36 inverts the current limiting signal $S_{LIM}$. The first AND gate 34 receives, as input signals, the set signal $S_{SET}$ and the output signal of the first inverter 36. The output signal of the first AND gate 34 is input to the set terminal (S) of the SR flip-flop 32.

A signal that corresponds to the set signal $S_{SET}$ is input to the set terminal (S) of the SR flip-flop 32. A signal that corresponds to the reset signal $S_{RST}$ is input to the reset terminal (R) of the SR flip-flop 32.

In the overcurrent state, the output signal of the first inverter 36 is set to low level. Otherwise, the output signal of the first inverter 36 is set to high level. That is to say, in the overcurrent state, the first AND gate 34 masks the set signal $S_{SET}$. The pulse signal $S_{PWM}$, which is the output Q of the SR flip-flop 32, is asserted (set to high level) every time the set signal $S_{SET}$' which has been subjected to masking is asserted.

The second AND gate 39 receives the mask signal $S_{MSK}$ and the current limiting signal $S_{LIM}$ as input signals. As described above, the mask signal $S_{MSK}$ is negated (set to low level) during a predetermined mask time $T_{MSK}$ after the switching transistor M1 is turned on. Subsequently, after the mask time $T_{MSK}$ elapses after the switching transistor M1 is turned on, the mask signal $S_{MSK}$ is asserted (set to high level). That is to say, the second AND gate 39 masks the current limiting signal $S_{LIM}$ until the mask time $T_{MSK}$ elapses after the switching transistor M1 is turned on.

The OR gate 38 receives the reset signal $S_{RST}$ and the output signal $S_{LIM}$' output from the second AND gate 39 as input signals. The output of the OR gate 38 is input to the reset terminal of the SR flip-flop 32.

Such a configuration provides a pulse signal generating unit 30 having the functions (a) and (b). It can be understood by those skilled in this art that various modifications may be made with respect to the pulse signal generating unit 30 having such functions, which are encompassed within the scope of the present invention.

A driver 40 outputs, to the gate of the switching transistor M1 via the switching terminal OUT, a switching signal that corresponds to the pulse signal $S_{PWM}$.

For example, the driver 40 includes dead time generating units 42 and 44, a second inverter 46, a third inverter 48, and transistors M2 and M3. The dead time generating units 42 and 44 each delay the input pulse signal $S_{PWM}$ by a predetermined dead time Td. The dead time Td thus applied prevents the transistors M2 and M3 from turning on at the same time.

The second inverter 46 inverts the output of the dead time generating unit 42, and outputs the output signal thus inverted to the gate of the high-side transistor M2. The third inverter 48 inverts the output of the dead time generating unit 44, and outputs the output signal thus inverted to the gate of the low-side transistor M3.

The aforementioned mask signal generating unit 14 may include a delay circuit which delays, by the mask time $T_{MSK}$, a signal that corresponds to the pulse signal $S_{PWM}$ generated by the pulse signal generating unit 30, that is, specifically, a signal which is asserted (set to high level) at a timing at which the switching transistor M1 is turned on.

The switching transistor M1 is turned on after the dead time Td elapses after the pulse signal $S_{PWM}$ transits from low level to high level. Accordingly, the output signal of the dead time generating unit 44 transits from low level to high level at a timing at which the switching transistor M1 is turned on. Thus, the mask signal generating unit 14 may also delay the output signal of the dead time generating unit 44 by a predetermined mask period $T_{MSK}$.

Figure 5A:
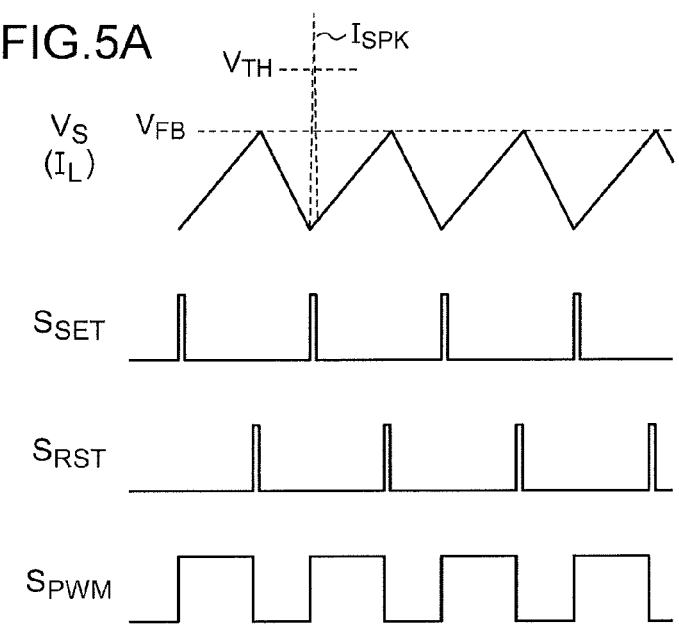
FIGS. 5A and 5B are waveform diagrams each showing the operation of the switching regulator shown in FIG. 3.
Figure 5B:
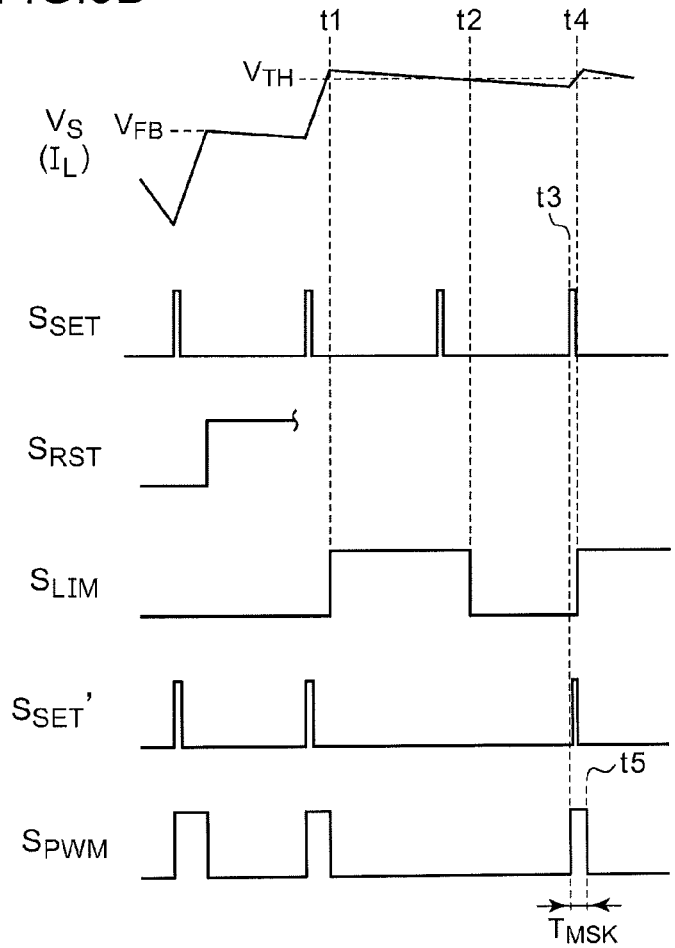

The above is the configuration of the control circuit 100. Next, description will be made regarding the operation of the switching regulator 2. FIGS. 5A and 5B are waveform diagrams each showing the operation of the switching regulator 2 shown in FIG. 3.

Referring to FIG. 5A, description will be made regarding the operation when the switching regulator 2 operates normally.

Every time the set signal $S_{SET}$ is asserted for every predetermined period, the pulse signal Sp is switched to high level, which turns on the switching transistor M1. When the switching transistor M1 is turned on, the coil current $I_L$ rises. When the detection voltage Vs reaches the feedback voltage $V_{FB}$, the reset signal $S_{RST}$ is asserted, which switches the pulse signal $S_{PWM}$ to low level. As a result, the switching transistor M1 is turned off.

If the spike current $I_{SPK}$ flows due to the discharge of the drain-source capacitance of the switching transistor M1 immediately after the switching transistor M1 is turned on, the detection voltage Vs exceeds the threshold voltage $V_{TH}$, which asserts the current limiting signal $S_{LIM}$. However, the spike current $I_{SPK}$ occurs in the mask time $T_{MSK}$. Thus, such an arrangement is capable of masking the spike current $I_{SPK}$ by means of the pulse signal generating unit 30, that is, more specifically, by means of the second AND gate 39.

Next, referring to FIG. 5B, description will be made regarding the operation of the switching regulator 2 in a state in which the output voltage $V_{OUT}$ of the switching regulator 2 falls due to a ground fault or the like.

If the output voltage $V_{OUT}$ falls, the coil current $I_L$ rises, leading to an increase in the detection voltage Vs. When the detection voltage Vs exceeds the threshold voltage $V_{TH}$ at the time point t1, the current limiting signal $S_{LIM}$ is asserted.

When the current limiting signal S$_{LIM}$ is asserted, the pulse signal S$_{PWM}$ is set to low level, which turns off the switching transistor M1.

During the period in which the detection voltage Vs is higher than the threshold voltage V$_{TH}$ after the time point t1, the current limiting signal S$_{LIM}$ is maintained at the high level. In this state, the set signal S$_{SET}$ is masked, which maintains the switching transistor M1 in the off state.

When the detection voltage Vs becomes lower than the threshold voltage V$_{TH}$ at the time point t2, the current limiting signal S$_{LIM}$ is negated. When the set signal S$_{SET}$ is asserted in the next cycle at the time point t3, the switching transistor M1 is turned on again.

This increases the coil current I$_L$ again. Subsequently, the detection voltage Vs exceeds the threshold voltage V$_{TH}$ at the time point t4. During the mask time T$_{MSK}$ after the time point t3, the current limiting signal S$_{LIM}$ is masked. Subsequently, at the time point t5 after the mask time T$_{MSK}$ elapses after the time point t3, the current limiting signal S$_{LIM}$' (not shown) is asserted, which turns off the switching transistor M1.

The above is the operation of the control circuit 100. With the control circuit 100, such an arrangement is capable of preventing the coil current I$_L$ from continuing to rise and of preventing the occurrence of a malfunction due to the spike current I$_{SPK}$ even if a ground fault occurs at the output of the switching regulator 2 or otherwise immediately after the switching regulator 2 is started up. As a result, such an arrangement provides improved circuit reliability.

Next, description will be made regarding the usage of the switching regulator 2.

The switching regulator 2 is suitably employed in a power supply block included in an AC adapter or an electronic device.

Figure 6:
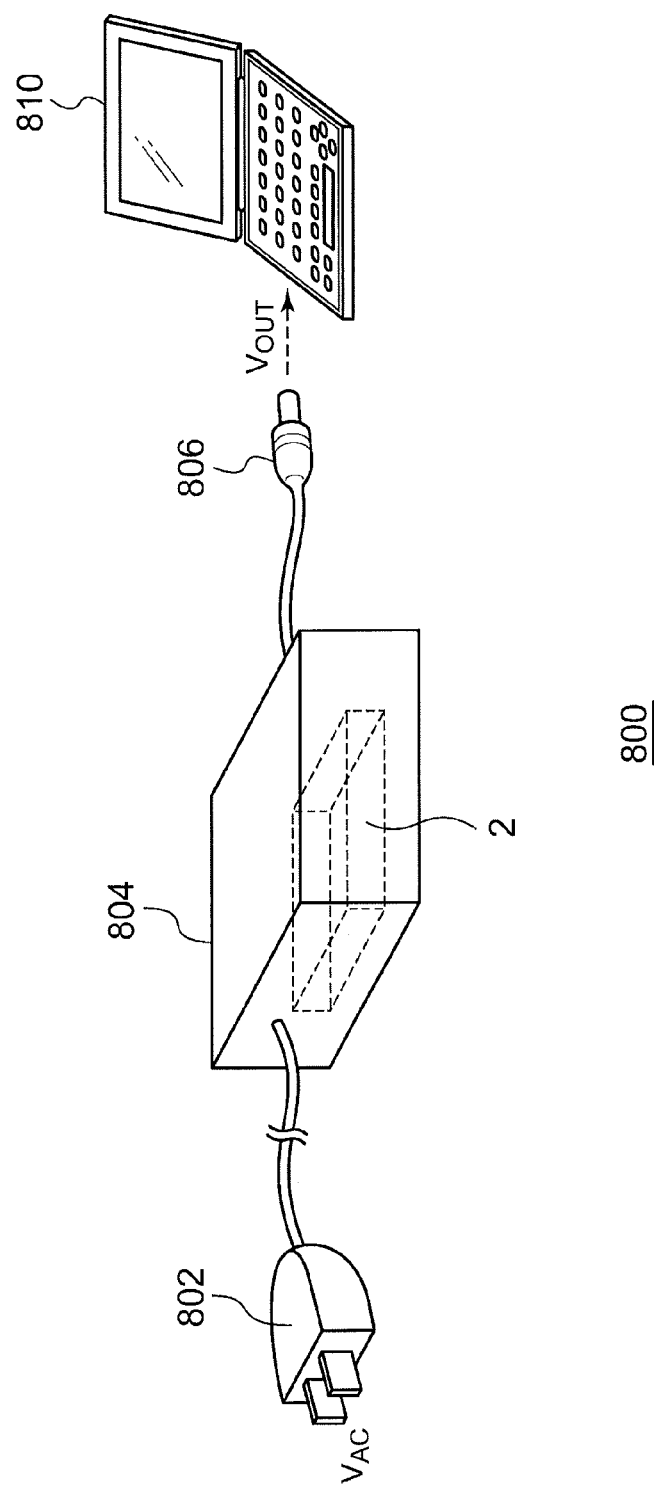
FIG. 6 is a diagram showing an AC adapter including the switching regulator.

FIG. 6 is a diagram showing an AC adapter 800 including the switching regulator 2. The AC adapter 800 includes a plug 802, a casing 804, and a connector 806. The plug 802 receives commercial AC voltage V$_{AC}$ from an unshown outlet. The switching regulator 2 is mounted within the casing 804. As an upstream stage of the switching regulator 2, a rectifier circuit is provided so as to convert the AC voltage into a DC voltage. The switching regulator 2 receives the DC voltage from the rectifier circuit. The DC output voltage V$_{OUT}$ generated by the switching regulator 2 is supplied to an electronic device 810 via the connector 806. Examples of such an electronic device 810 include laptop PCs, digital still cameras, digital video cameras, cellular phones, portable audio players, and the like.

Figure 7A:
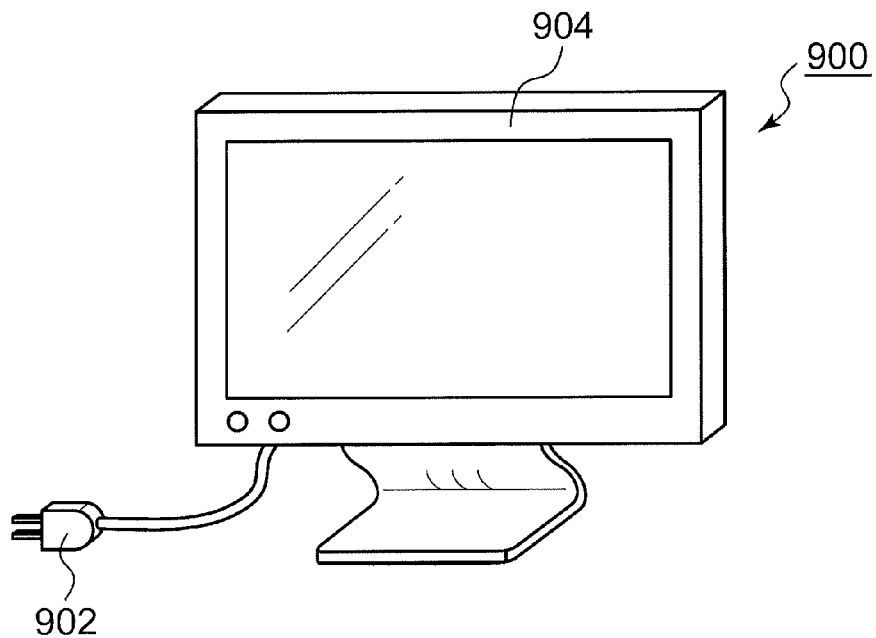
FIGS. 7A and 7B are diagrams each showing an electronic device including the switching regulator.
Figure 7B:
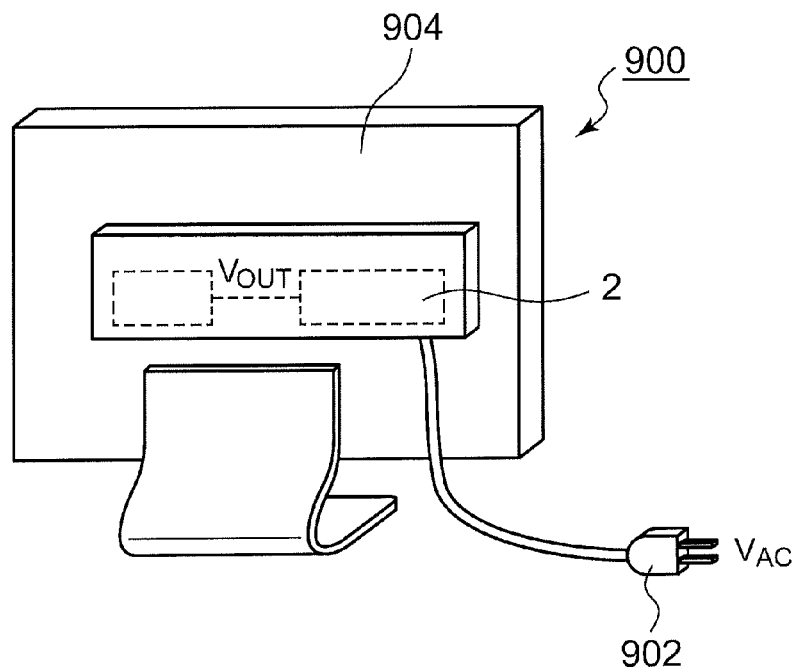

FIGS. 7A and 7B are diagrams each showing an electronic device 900 including the switching regulator 2. The electronic device 900 shown in FIGS. 7A and 7B is configured as a display apparatus. However, the electronic device 900 is not particularly restricted in kind, as long as it includes a power supply apparatus as an internal component. Examples of such an electronic device 900 include audio devices, refrigerators, washing machines, vacuum cleaners, etc.

The plug 902 receives commercial AC voltage V$_{AC}$ from an unshown outlet. As an upstream stage of the switching regulator 2, a rectifier circuit is provided so as to convert the AC voltage into a DC voltage. The switching regulator 2 receives the DC voltage from the rectifier circuit. The switching regulator 2 is mounted within the casing 904. The DC output voltage V$_{OUT}$ generated by the switching regulator 2 is supplied to a load mounted in the same casing 904. Examples of such a load include microcomputers, DSPs (Digital Signal Processors), lighting devices, analog circuits, digital circuits, and the like.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Figure 2:
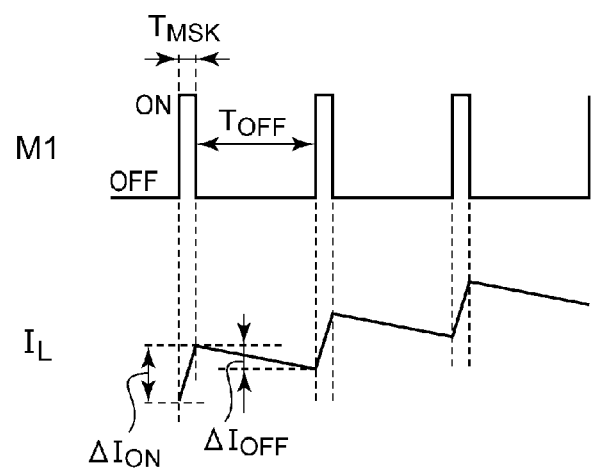
FIG. 2 is a waveform diagram for the switching regulator shown in FIG. 1 when a ground fault has occurred at the output.

It should be noted that the assignment of the asserted state and the negated state to the high level and the low level is no more than a matter of design choice. It is needless to say that such assignment may be mutually exchanged as appropriate, and accordingly, the circuit configurations shown in FIGS. 2 and 3 may be modified as appropriate according to the assignment thus modified, as will be readily understood by those skilled in this art.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a switching regulator configured to receive an input voltage via its input terminal, and to output a stepped-down output voltage via its output terminal, wherein the switching regulator comprises:
   a switching transistor, a detection resistor, and an inductor, sequentially arranged in series between the input terminal and the output terminal;
   a rectifier diode arranged between a ground terminal and a connection node that connects the switching transistor and the detection resistor; and
   an output capacitor arranged between the output terminal and the ground terminal,
   and wherein the control circuit comprises:
   a switching terminal to be connected to a control terminal of the switching transistor;
   a current detection terminal to be connected to the connection node that connects the switching transistor and the detection resistor;
   a ground terminal to be connected to a connection node that connects the detection resistor and the inductor;
   a feedback terminal via which a feedback voltage that corresponds to the output voltage is to be input;
   a current limiting comparator configured to generate a current limiting signal which is asserted when a detection voltage at the detection terminal is higher than a predetermined threshold voltage;
   an oscillator configured to generate a set signal which is asserted for every predetermined period;
   a mask signal generating unit configured to generate a mask signal which is asserted after a predetermined delay time elapses after the switching transistor is turned on;
   a reset signal generating unit configured to generate a reset signal which is asserted at a timing that is adjusted according to the feedback voltage;
   a pulse signal generating unit configured to generate a pulse signal which is set to a first level during a period in which the switching transistor is to be turned on, and which is set to a second level during a period in which the switching transistor is to be turned off, and to have: a function (a) in which, when the set signal is asserted in a period in which the current limiting signal is negated, the pulse signal is switched to the first level; and a function (b) in which, when the reset signal is asserted, or when the current limiting signal is asserted in a period in which the mask signal is negated, the pulse signal is switched to the second level; and a driver configured to output a switching signal that corresponds to the pulse signal, to the control terminal of the switching transistor via the switching terminal.

2. The control circuit according to claim 1, wherein the pulse signal generating unit comprises:

a first inverter configured to invert the current limiting signal;

a first AND gate configured to receive the set signal and an output signal of the first inverter as input signals; and an SR flip-flop configured to have a set terminal via which an output signal of the first AND gate that corresponds to the set signal is input, and to have a reset terminal via which a signal that corresponds to the reset signal is input.

3. The control circuit according to claim 2, further comprising:

a second AND gate configured to receive the mask signal and the current limiting signal as input signals; and an OR gate configured to receive the reset signal and an output signal of the second AND gate as input signals, wherein an output signal of the OR gate that corresponds to the reset signal is input to the reset terminal of the SR flip-flop.

4. The control circuit according to claim 1, wherein the pulse signal generating unit comprises:

a second AND gate configured to receive the mask signal and the current limiting signal as input signals;

an OR gate configured to receive the reset signal and an output signal of the second AND gate as input signals; and an SR flip-flop configured to have a set terminal via which a signal that corresponds to the set signal is input, and to have a reset terminal via which an output signal of the OR gate that corresponds to the reset signal is input.

5. The control circuit according to claim 1, wherein the reset signal generating unit comprises an error comparator configured to compare the detection voltage with the feedback voltage and to generate the set signal which is asserted when the detection voltage becomes higher than the feedback voltage.

6. The control circuit according to claim 5, wherein the reset signal generating unit comprises:

a slope generating unit configured to generate a slope signal having a triangle waveform or otherwise a sawtooth waveform in synchronization with the set signal; and an adder configured to generate the sum of the detection voltage and the slope signal.

7. The control circuit according to claim 1, wherein the mask signal generating unit comprises a delay circuit configured to delay a signal that corresponds to the pulse signal.

8. A switching regulator configured to receive an input voltage via its input terminal, and to output a stepped-down output voltage via its output terminal, the switching regulator comprising:

a switching transistor, a detection resistor, and an inductor, sequentially arranged in series between the input terminal and the output terminal;

a rectifier diode arranged between a ground terminal and a connection node that connects the switching transistor and the detection resistor;

an output capacitor arranged between the output terminal and the ground terminal; and the control circuit according to claim 1, configured to drive the switching transistor.

9. An electronic device comprising the switching regulator according to claim 8.

10. An AC adapter comprising the switching regulator according to claim 8.

* * * * *